United States Patent [19]

Kenan et al.

[11] 4,403,833
[45] Sep. 13, 1983

[54] ELECTROOPTICAL MULTIPLIERS

[75] Inventors: Richard P. Kenan, Upper Arlington; Carl M. Verber, Columbus, both of Ohio

[73] Assignee: Battelle Memorial Institute, Columbus, Ohio

[21] Appl. No.: 293,779

[22] Filed: Aug. 18, 1981

[51] Int. Cl.³ .............................................. G02F 1/03
[52] U.S. Cl. .................................... 350/356; 372/12; 350/96.14
[58] Field of Search ............... 350/356, 96.14; 372/12, 372/98

Primary Examiner—William L. Sikes
Assistant Examiner—Léon Scott, Jr.
Attorney, Agent, or Firm—Philip M. Dunson

[57] ABSTRACT

Apparatus (FIG. 2) receives light (11) in an input direction (12) and controls the directions in which portions of it travel through regions (13,14) to emerge (at 15) in an output direction (16) with intensity responsive to the product of two electrical potential differences multiplied together.

Electrooptic reflective means (18) comprising two electrodes (19,20), on a region (13) in a waveguide (17), form a first Bragg grating (18) with a direction of Bragg incidence in the input direction (12). Similar means (23) comprising two electrodes (24,25), on a region (14), form a second Bragg grating (23) with a direction of Bragg incidence the same as a direction of Bragg reflection (22) from the first grating.

A prism (26) directs light (11) from a laser (27) to enter in the input direction (12) into the electrooptic means (18). Control means (28) apply a potential difference (A) to the electrodes (19,20), to further direct light (11) in the region (13) by providing a first Bragg reflection thereof into the region (14). Control means (30) apply a potential difference (B) to the electrodes (24,25), to further direct light (11) by providing a second Bragg reflection thereof in the output direction (16) to output means (35,33) (FIG. 3), which receive the twice-reflected light and respond thereto.

Apparatus as in FIGS. 3 and 5 can perform multiplication of vectors, and of a matrix by a vector.

29 Claims, 9 Drawing Figures

ELECTROOPTICAL MULTIPLIERS

The Government has rights in this invention pursuant to Contract No. F49620-79-C-0044 awarded by Air Force Office of Scientific Research.

FIELD

This invention relates to apparatus for receiving light entering in a predetermined input direction and controlling the directions in which portions of the light travel through regions thereof so as to emerge in a selected output direction with intensity responsive to the product of a plurality of electrical potential differences multiplied together.

Such apparatus, according to the present invention, typically comprises an electrooptic waveguide, first electrooptic reflective means, comprising a first electrode and a second electrode, on a first region in the waveguide, for forming a first Bragg grating in the first region positioned with a direction of Bragg incidence approximately in the predetermined input direction, second electrooptic reflective means, comprising a third electrode and a fourth electrode, on a second region in the waveguide, for forming a second Bragg grating in the second region positioned with a direction of Bragg incidence in approximately the same direction as a direction of Bragg reflection from the first Bragg grating, light input means for directing light of known or controlled intensity to enter approximately in the predetermined input direction into the first electrooptic means, first control means for applying a first electrical potential to the first electrode and a second electrical potential to the second electrode, to further direct a portion of the light entering into the first region by providing a first Bragg reflection thereof into the second region, second control means for applying a third electrical potential to the third electrode and a fourth electrical potential to the fourth electrode, to further direct a portion of the light reflected into the second region by providing a second Bragg reflection thereof beyond the second region in the selected output direction, and output means for receiving the twice-reflected light travelling beyond the second region in the selected output direction and for responding thereto.

The terms "reflect", "reflective", etc. are used herein broadly to relate to any changing of direction or bending of the general type commonly provided by mirrors, gratings, beam splitters, and the like. In the Bragg gratings and beam splitters employed in typical embodiments of the present invention, the reflections are of course provided by the phenomenon more particularly called diffraction. So the words "reflection" and "diffraction", and their corresponding verbs, adjectives, etc., can be considered to be substantially synonyms as used herein, especially in describing and defining typical features of the invention.

The term "IOC" is used herein as an abbreviation or acronym for "integrated optical circuit".

BACKGROUND

The present invention is related to the subject matter of our copending U.S. patent application Ser. No. 221,956, filed Dec. 31, 1980, for Controlling light. Said application is assigned to the assignee of the present invention. To the extent that any subject matter disclosed or claimed in the present application may be considered to be disclosed in, or obvious from, our copending earlier application cited above, the benefit of the filing date of the earlier application is hereby claimed for such subject matter under 35 USC 120. Also said application is hereby incorporated hereinto by reference and made a part hereof the same as if fully set forth herein.

The electrooptic components employed in typical embodiments of the present invention are now well known. Convenient ways of making them are described in the above mentioned patent application and in the references cited therein.

Apparatus according to the present invention typically comprises an electrooptic waveguide upon which is placed a double array of interdigital electrodes similar to the ones shown in the drawings. When any element of this array is actuated by the application of a voltage relative to the center electrode, a phase grating is induced into the waveguide underneath that can efficiently diffract light incident upon it at the correct (Bragg) angle. If the left half of the array is actuated with voltages $V_1, V_2, \ldots$, and the corresponding elements of the array are actuated with voltages $V_1', V_2', \ldots$, then light diffracted from the left half of an array element will be rediffracted from the right half of the element. The twice-diffracted light has intensity given by $$I_j = \eta_j \eta_j' \cdot I_O$$

for the j-th element, where $I_O$ is the incident intensity, and $\eta_j$, $\eta_j'$ are the efficiencies of the gratings induced by $V_j$ and $V_j'$, respectively. The efficiency of an induced grating is $$\eta = \sin^2(\alpha V)$$

where $\alpha$ is a constant, independent of V, and V is the applied voltage. For small signals, the twice-diffracted beam from element j will have intensity proportional to $V_j^2 \cdot V_j'^2$, so summing over j will give an intensity proportional to the vector product $\vec{P} \cdot \vec{P}'$, the vectors whose components are power stored on the array elements (power stored $= CV^2/2$ where C is the capacitance of the element). If the electrodes are biased to the inflection point of the grating response curve (efficiency-vs-voltage), then the small-signal from an element will be a linear function of the product of the voltages. In this case, the output beam will have a recoverable part whose intensity is proportional to the product of the voltages, and their summation will have a part proportional to the vector product $V \cdot V'$, where the components are the voltages. This may be a more useful application.

Other typical apparatus according to the invention comprises an arrangement for utilizing an electrooptic vector multiplying element to generate the product of a matrix times a vector. If the matrix is written as the array of its row vectors, $$\overline{\overline{M}} = (\vec{M_1}, \vec{M_2}, \ldots \vec{M_N}),$$

then the device generates $$\overline{\overline{M}}\vec{v} = (\vec{M_1}\vec{v}, \vec{M_2}\vec{v}, \vec{M_3}\vec{v}, \ldots, \vec{M_N}\vec{v}).$$

The arrangement produces the terms in the expansion in a unique way by generating $\vec{v}$ once, then replicating N times, thus reducing the number of connections needed from $2N^2+1$ to $N^2+N1$ a reduction of $N^2-N$. The indicated summation is performed by a lens.

Typical apparatus according to the present invention for receiving light entering in a predetermined input direction therein and controlling the directions in which portions of the light travel through regions thereof so as to emerge therefrom in a selected output direction with intensity responsive to the product of a plurality of electrical potential differences multiplied together, comprises an electrooptic waveguide, first electrooptic reflective means, comprising a first electrode and a second electrode, on a first region in the waveguide, for forming a first Bragg grating in the first region positioned with a direction of Bragg incidence approximately in the predetermined input direction, intermediate means for directing light reflected from the first Bragg grating in a predetermined intermediate direction into a second region in the waveguide, second electrooptic reflective means, comprising a third electrode and a fourth electrode, on the second region in the waveguide, for forming a second Bragg grating in the second region positioned with a direction of Bragg incidence in approximately the predetermined intermediate direction, light input means for directing light of known controlled intensity to enter approximately in the predetermined input direction into the first electrooptic means, first control means for applying a first electrical potential to the first electrode and a second electrical potential to the second electrode, to further direct a portion of the light entering into the first region by providing a first Bragg reflection thereof into the intermediate means, and second control means for applying a third electrical potential to the third electrode and a fourth electrical potential to the fourth electrode, to further direct a portion of the light reflected into the second region by providing a second Bragg reflection thereof beyond the second region in the selected output direction.

Where the predetermined intermediate direction is approximately the same as a direction of Bragg reflection from the first Bragg grating, the intermediate means typically comprises means (which may be merely a portion of the waveguide) for transmitting light reflected from the first Bragg grating further in approximately the same direction into the second region in the waveguide.

Where the predetermined intermediate direction is different from any direction of Bragg reflection from the first Bragg grating, the intermediate means typically comprises means for changing the direction of light reflected from the first Bragg grating and directing it in approximately the predetermined intermediate direction into the second region of the waveguide.

Typical combination apparatus according to the invention may comprise a plurality of individual such apparatuses, each arranged adjacent to and in tandem with another.

The apparatus comprises also output means for receiving the twice-reflected light travelling beyond the second region in the selected output direction and for responding thereto.

In some typical embodiments of the invention the first control means comprises means for providing a fixed component of potential difference between the first and second electrodes such as to bias them to a value where the grating response is approximately a linear function of potential difference within a known range, and a variable component of potential difference within the range of the approximately linear response function; and the second control means comprises means for providing a fixed component of potential difference between the third and fourth electrodes such as to bias them to a value where the grating response is approximately a linear function of potential difference within a known range, and a variable component of potential difference within the range of the approximately linear response function; whereby the intensity of the light emerging in the selected output direction includes a part that is approximately a linear function of the product of the variable component of potential difference provided by the first control means multiplied by the variable component of potential difference provided by the second control means.

Some such embodiments typically comprise also means for providing an electric signal of amplitude responsive to the intensity of the light emerging in the selected output direction, and means for removing substantially all alternating components from the signal and thus leaving only direct components, which comprise approximately a linear function of the product of the variable component of potential difference provided by the first control means multiplied by the variable component of potential difference provided by the second control means.

Other such embodiments typically comprise also means for providing an electric signal of amplitude responsive to the intensity of the light emerging in the selected output direction, and means for removing substantially all components from the signal except the second harmonic alternating component, which comprises approximately a linear function of the product of the variable component of potential differences provided by the first control means multiplied by the variable component of potential difference provided by the second control means.

In typical embodiments of the invention for use in digital data processing equipment, the first control means comprises means for providing selectively either approximately zero potential difference or at least approximately a predetermined finite potential difference between the first and second electrodes, and the second control means comprises means for providing selectively either approximately zero potential difference or at least approximately a predetermined finite potential difference between the third and fourth electrodes; whereby the intensity of the light emerging in the selected output direction at a given instant is either approximately zero or at least approximately a determinable output value, as a digital binary AND function of the potential differences provided by the first and second control means.

Typical combination analog processing apparatus according to the invention comprises a plurality of individual such apparatuses, each arranged adjacent to and in tandem with another, wherein each first control means for providing a potential difference within a range wherein the grating response is approximately a quadratic function of potential difference, and each second control means comprises means for providing a potential difference within a range wherein the grating response is approximately a quadratic function of potential difference.

Such apparatus typically comprises also output means for receiving the twice-reflected light travelling beyond each second region in the selected output direction and directing substantially all of it to means for providing an electric signal of amplitude responsive to the intensity of the light and thus providing an indication responsive to the vector inner product of the squares of the potential differences on the individual first control means and the squares of the potential differences on the respective individual second control means.

Other typical, and generally preferred, apparatus according to the invention comprises, in combination, a plurality of individual such apparatuses, each operating within the range of its approximately linear response function and arranged adjacent to and in tandem with another, and output means for receiving the twice-reflected light travelling beyond each second region in the selected output direction and directing substantially all of it to means for providing an electric signal of amplitude responsive to the intensity of the light and thus providing an indication responsive to the vector inner product of the variable components of the potential differences on the individual first control means and the variable components of the potential differences on the respective individual second control means. In such apparatus, the output means typically comprises means for imaging the output light from the individual apparatuses onto photoelectric means.

Typical further combined apparatus according to the invention comprises a plurality of such combinations of individual apparatuses, wherein individual potential differences comprising analogs of the individual component values of a selected vector are connected to the same respective first electrooptic reflective means in each such combination of individual apparatuses, and individual potential differences comprising analogs of the individual values in each row of a selected matrix are connected to the same respective second electrooptic reflective means in one such combination, the potential differences for each row of the matrix being connected to a different combination of individual apparatuses from any combination to which the potential differences for any other row are connected, whereby the output of each separate combination of individual apparatuses is an analog of one component value of the vector product of the selected matrix and the selected vector.

Other typical, and generally preferred, further combined apparatus for use in matrix by vector multiplication comprises a plurality of individual first electrooptic reflective means, each arranged adjacent to and in tandem with another;

a like plurality of individual first control means, one for each individual first electrooptic reflective means;

a first like plurality of individual second electrooptic reflective means, one for each first electrooptic reflective means, each arranged adjacent to and in tandem with another, to form a first combination of individual second electrooptic reflective means;

a first like plurality of individual second control means, one for each individual second electrooptic reflective means in the first combination thereof, to form a first set of individual second control means;

at least one additional like combination of individual second electrooptic reflective means;

an additional like set of individual second control means for each additional combination of individual second electrooptic reflective means;

a plurality of intermediate means, one for each combination of individual second electrooptic reflective means, for directing light reflected from each first Bragg grating in the plurality of first electrooptic reflective means in approximately equal portions to the corresponding second Bragg grating in each combination of individual second electrooptic reflective means; and a plurality of output means, one for each combination of individual second electrooptic reflective means;

each output means comprising means for receiving the light travelling beyond each second electrooptic reflective means in the selected output direction and directing substantially all of it to means for providing an electric signal of amplitude responsive to the intensity of the light and thus providing an indication that is an analog of one component value of the vector product of a matrix and a vector; where the potential differences provided by the individual first control means comprise analogs of the individual component values of the vector, the potential differences provided by the individual second control means of the first set thereof comprise analogs of the individual values in the first row of the matrix, and the potential differences provided by the individual second control means of each additional set thereof comprise analogs of the individual values in each respective succeeding row of the matrix,

DRAWINGS

CARRYING OUT THE INVENTION

Figure 2:
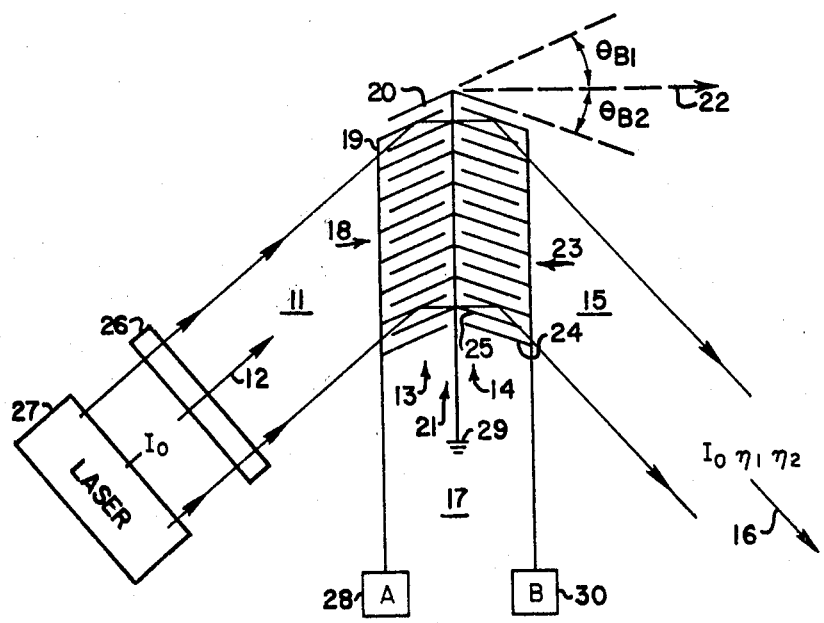
FIG. 2 is a schematic plan view of a typical grating structure, comprising electrodes of the type shown in FIG. 1, for performing multiplication according to the present invention.

Referring now especially to FIG. 2, typical apparatus according to the present invention for receiving light 11 entering in a predetermined input direction 12 therein and controlling the directions in which portions of the light travel through regions 13,14 thereof so as to emerge, as at 15, therefrom in a selected output direction 16, with intensity responsive to the product of a plurality of electrical potential differences multiplied together, comprises an electrooptic waveguide 17, first electrooptic reflective means 18, comprising a first electrode 19 and a second electrode 20, on a first region 13 in the waveguide 17, for forming a first Bragg grating 18 in the first region 13 positioned with a direction of Bragg incidence approximately in the predetermined input direction 12, intermediate means 21 for directing light 11 reflected from the first Bragg grating 18 in a predetermined intermediate direction 22 into a second region 14 in the waveguide 17, second electrooptic reflective means 23, comprising a third electrode 24 and a fourth electrode 25, on the second region 14 in the waveguide 17, for forming a second Bragg grating 23 in the second region 14 positioned with a direction of Bragg incidence in approximately the predetermined intermediate direction 22, light input means 26, such as a prism, for directing light 11 of known or controlled intensity (as from a laser 27, or other suitable light source; and collimating means, not shown) to enter approximately in the predetermined input direction 12 into the first electrooptic means 18, first control means 28 for applying a first electrical potential (A in FIG. 2) to the first electrode 19 and a second electrical potential (the ground 29 in FIG. 2) to the second electrode 20, to further direct a portion of the light 11 entering into the first region 13 by providing a first Bragg reflection thereof into the intermediate means 21, and second control means 30 for applying a third electrical potential (B in FIG. 2) to the third electrode 24 and a fourth electrical potential (the ground 29 in FIG. 2) to the fourth electrode 25, to further direct a portion of the light 11 reflected into the second region 14 by providing a second Bragg reflection thereof beyond the second region 14 in the selected output direction 16.

Where the predetermined intermediate direction 22 is approximately the same as a direction of Bragg reflection from the first Bragg grating 18, the intermediate means 21 typically comprises means (merely a portion of the waveguide 17 in FIG. 2) for transmitting light reflected from the first Bragg grating 18 further in approximately the same direction 22 into the second region 14 in the waveguide 17.

Where the predetermined intermediate direction 22 is different from any direction of Bragg reflection (such as 22A in FIG. 5) from the first Bragg grating 18, the intermediate means 21 typically comprises means 21A,21B, 21C for changing the direction of light 11 reflected from the first Bragg grating 18 and directing it in approximately the predetermined intermediate direction 22 into the second region 14 of the waveguide.

The apparatus typically comprises also output means 35,33 (FIG. 3) for receiving the twice-reflected light 15 travelling beyond the second region 14 in the selected output direction 16 and for responding thereto.

As the drawings show schematically, the first electrode 19 typically comprises a first set of substantially straight and parallel, thin, elongate, electrically conductive members connected together at one end, and the second electrode 20 typically comprises a second set of substantially straight and parallel, thin, elongate, electrically conductive members, interleaved with the first set, insulated therefrom, and connected together at the opposite end. Similarly, the third electrode 24 typically comprises a third set of substantially straight and parallel, thin, elongated, electrically conductive members, connected together at one end, and the fourth electrode 25 typically comprises a fourth set of substantially straight and parallel, thin, elongate, electrically conductive members, interleaved with the third set, insulated therefrom, and connected together at the opposite end.

As shown especially in FIG. 2, the third and fourth electrodes 24,25 typically are positioned with their conductive members at an angle from the first and second electrodes 19,20 that is approximately equal to the Bragg angle $\theta B_1$ of the first grating 18 plus the Bragg angle $\theta B_2$ of the second grating 23. Typically the Bragg angle $\theta B_1$ of the first grating 18 is approximately equal to the Bragg angle $\theta B_2$ of the second grating 23. Also the second electrooptic reflective means 23 typically comprises approximately a mirror image of the first electrooptic reflective means 18.

Figure 7:
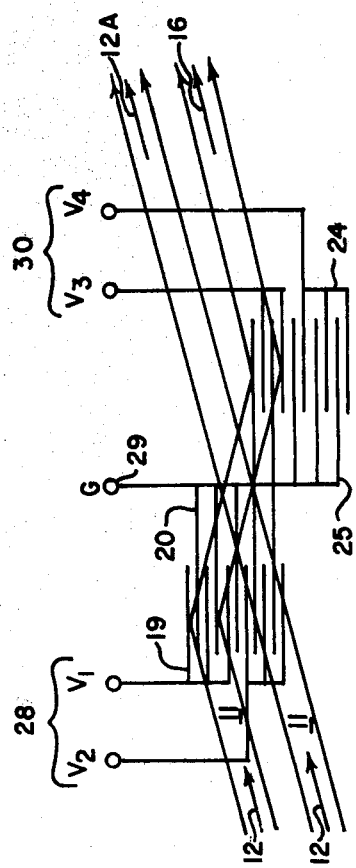
FIG. 7 is a schematic plan view of a typical arrangement of grating structures in tandem as in FIG. 6, but with the second column of gratings shifted downward from the first column.
Figure 6:
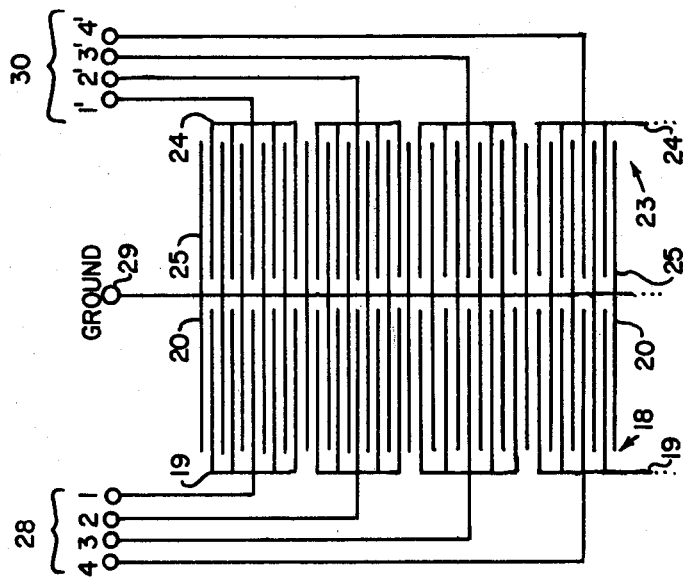
FIG. 6 is a schematic plan view of a typical alternative, and less preferred, arrangement of grating structures in tandem, as in FIG. 3, but with all electrodes parallel to each other.

In an alternative, and less preferred, arrangement, the first, second, third, and fourth electrodes 19,20,24, 25 may be positioned with their conductive members all approximately parallel to each other as in FIG. 6. In a better such arrangement, the second electrooptic reflective means 23 comprises approximately a mirror image of the first electrooptic reflective means 18, shifted in a direction perpendicular to the lengthwise direction of the electrodes 19,20,24,25, as in FIG. 7, so that the twice-reflected light 15 travelling beyond the second region 14 in the selected output direction 16 has approximately the same direction of travel as that of any light entering in the predetermined input direction 12 and continuing through without any reflection, as at 12A, but is spaced apart therefrom.

Figure 8:
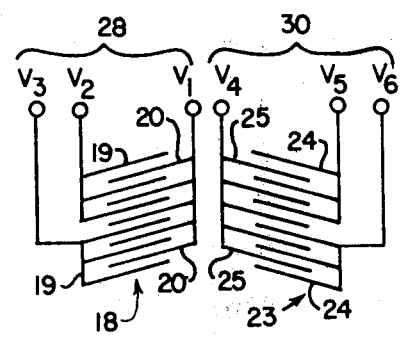
FIG. 8 is a schematic plan view of a typical arrangement of grating structures in tandem as in FIG. 3, but with all electrodes of the first column insulated from those of the second column.

In some typical embodiments, an electrode 20 of the first electrooptic reflective means 18 is connected to an electrode 25 of the second electrooptic reflective means 23, as in FIGS. 2,3,6,7. In others, the first, second, third, and fourth electrodes 19,20,24,25 are all insulated from each other, as in FIGS. 8 and 9.

Figure 3:
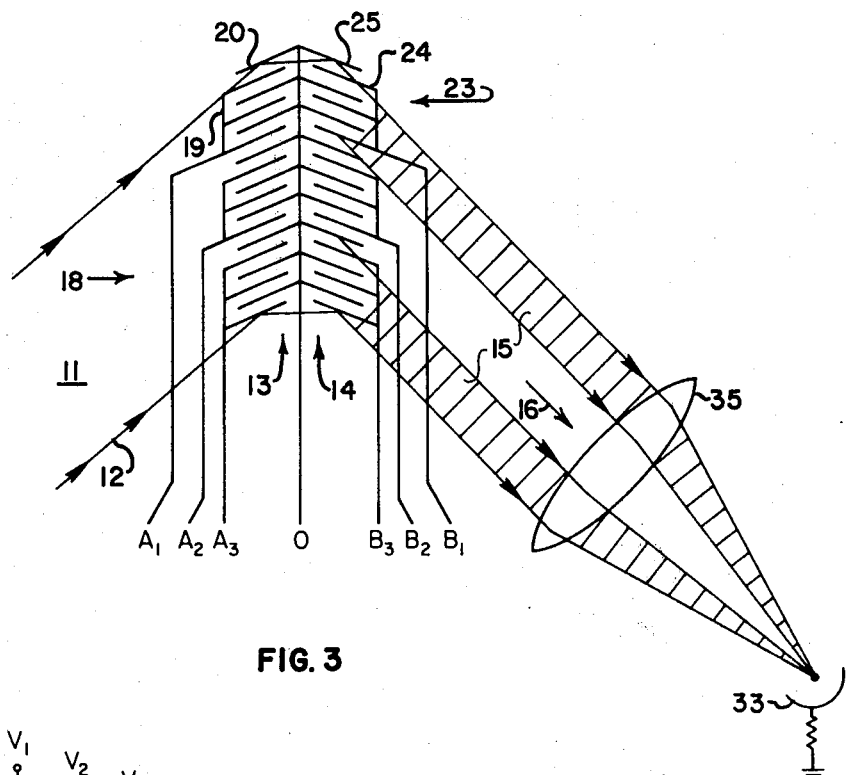
FIG. 3 is a schematic plan view of three grating structures as in FIG. 2, arranged in tandem; with output means for summing three products; according to the invention.
Figure 5:
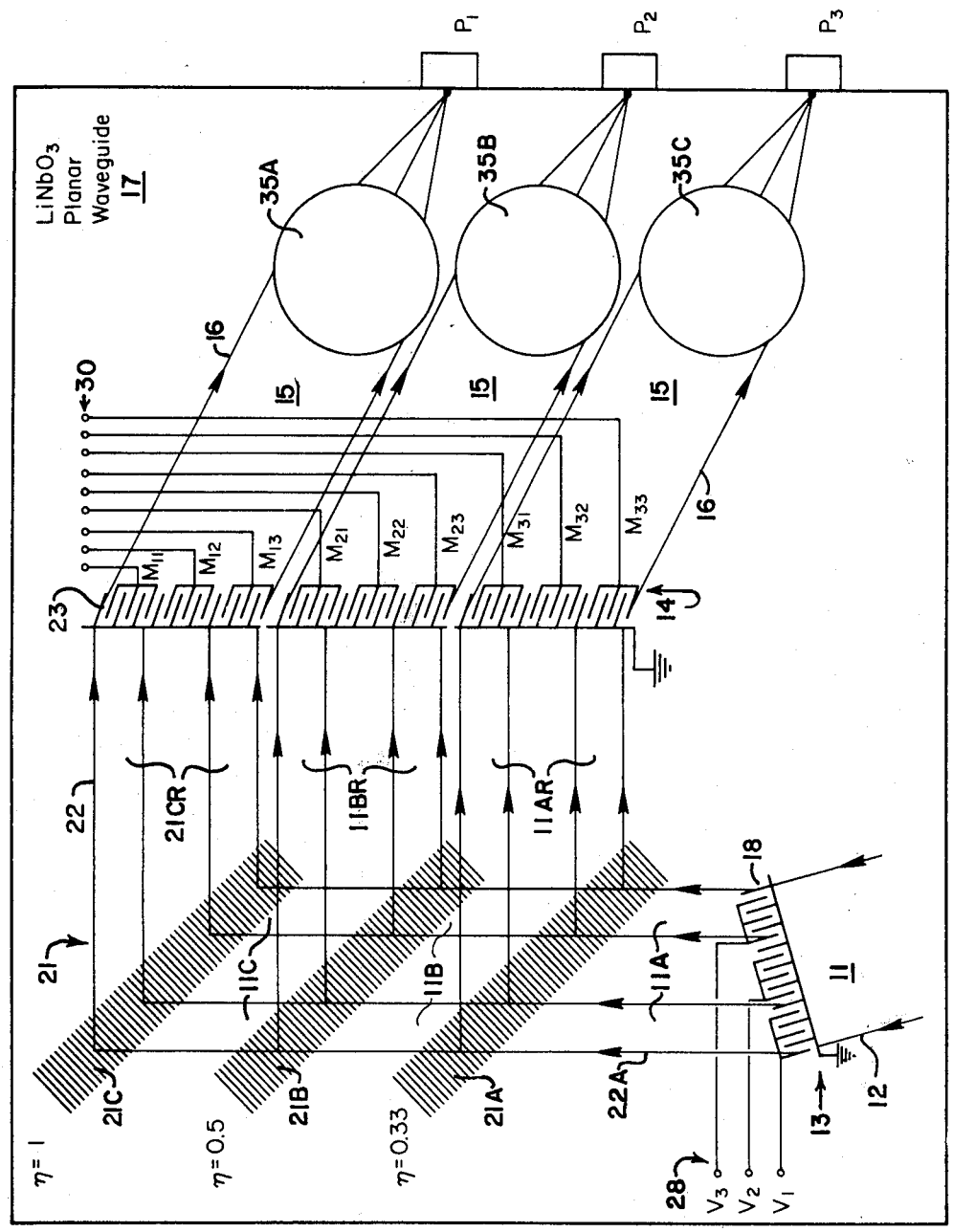
FIG. 5 is a schematic plan view of typical apparatus according to the invention for performing multiplication of a vector times a matrix.
Figure 9:
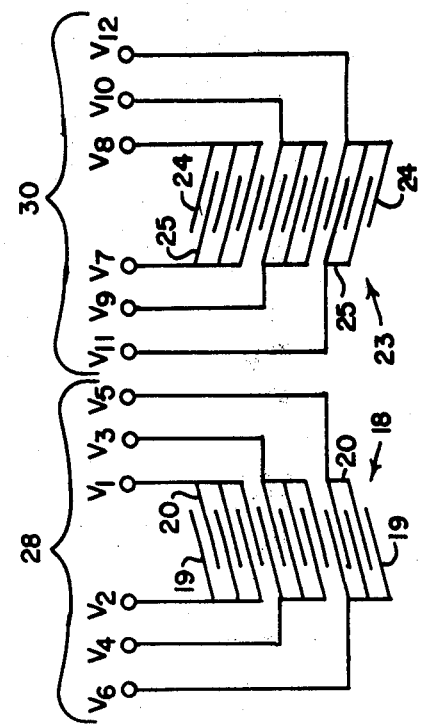
FIG. 9 is a schematic plan view of a typical arrangement of grating structures as in FIG. 8, but with all electrodes insulated from each other.

Typical combination apparatus according to the invention may comprise a plurality of individual such apparatuses, each arranged adjacent to and in tandem with another, as in FIGS. 3,5, and 9. In some typical such embodiments an electrode 20 of the first electrooptic reflective means 18 in each individual apparatus is connected to an electrode 20 of the first electrooptic reflective means 18 in another individual apparatus, and an electrode 25 of the second electrooptic reflective means 23 in each individual apparatus is connected to an electrode 25 of the second electrooptic reflective means 23 in another individual apparatus, as in FIG. 3. In others, the electrodes 19,20,24,25 of each individual apparatus are insulated from the electrodes 19,20,24,25 of the other individual apparatuses, as in FIG. 9.

In some typical embodiments of the invention, the first control means 28 comprises means for providing a fixed component of potential difference (such as from a direct voltage source, not shown) between the first and second electrodes 19,20 such as to bias them to a value where the grating response is approximately a linear function of potential difference within a known range, and a variable component of potential difference (such as from a fixed frequency oscillator, amplitude modulated by the desired signal voltage, not shown) within the range of the approximately linear response function; and the second control means 30 also comprises means for providing a fixed component of potential difference between the third and fourth electrodes such as to bias them to a value where the grating response is approximately a linear function of potential difference within a known range, and a variable component of potential difference within the range of the approximately linear response function; whereby the intensity of the light 15 emerging in the selected output direction 16 includes a part that is approximately a linear function of the product of the variable component of potential difference provided by the first control means 28 multiplied by the variable component of potential difference provided by the second control means 30.

Some such embodiments typically comprise also means 33 for providing an electric signal of amplitude responsive to the intensity of the light 15 emerging in the selected output direction 16, and means (such as a shunting capacitor, not shown) for removing substantially all alternating components from the signal and thus leaving only direct components, which comprise approximately a linear function of the product of the variable component of potential difference provided by the first control means 28 multiplied by the variable component of potential difference provided by the second control means 30. Other such embodiments typically comprise also means 33 for providing an electric signal of amplitude responsive to the intensity of the light 15 emerging in the selected output direction 16, and means (such as a shunting parallel resonant circuit or other suitable bandpass filter, not shown) for removing substantially all components from the signal except the second harmonic alternating component, which comprises approximately a linear function of the product of the variable components of potential difference provided by the first control means 28 multiplied by the variable component of potential difference provided by the second control means 30.

In typical embodiments of the invention for use in digital data processing equipment, the first control means 28 comprises means (such as any suitable binary digital logic circuitry, not shown) for providing selectively either approximately zero potential difference or at least approximately a predetermined finite potential difference between the first and second electrodes 19,20, and the second control means 30 comprises a generally similar type of means for providing selectively either approximately zero potential difference or at least approximately a predetermined finite potential difference between the third and fourth electrodes 24,25; whereby the intensity of the light 15 emerging in the selected output direction 16 at a given instant is either approximately zero or at least approximately a determinable output value, as a digital binary AND function of the potential differences provided by the first and second control means 28,30.

Typical combination analog processing apparatus according to the invention comprises a plurality of individual apparatuses, each arranged adjacent to and in tandem with another, as in FIGS. 3 and 9, and each first control means 28 typically comprises means for providing a potential difference (such as from an analog electrical voltage source, not shown) within a range wherein the grating response is approximately a quadratic function of potential difference, and each second control means 30 typically comprises a generally similar type of means for providing a potential difference within a range wherein the grating response is approximately a quadratic function of potential difference. Such apparatus typically comprises also output means, such as the lens 35 in FIG. 3, for receiving the twice-reflected light 15 travelling beyond each second region 14 in the selected output direction 16 and directing substantially all of it to means 33 for providing an electric signal of amplitude responsive to the sum of the intensities of the light beams 15 and thus providing an indication responsive to the vector inner product of the squares of the potential differences on the individual first control means 28 and the squares of the potential differences on the respective individual second control means 30.

Other typical, and generally preferred, apparatus according to the invention comprises, in combination, a plurality of individual apparatuses, each operating within the range of its approximately linear response function and tandem with another, as in FIGS. 3 and 9, and output means, such as the lens 35 in FIG. 3, for receiving the twice-reflected light 15 travelling beyond each second region 14 in the selected output direction 16 and directing substantially all of it to means 33 for providing an electrical signal of amplitude responsive to the intensity of the light 15 and thus providing an indication responsive to the vector inner product of the variable components of the potential differences on the individual first control means 28 and the variable components of the potential differences on the individual second control means 30. In such apparatus, the output means typically comprises means 35 for imaging the output light 15 from the individual apparatuses onto photoelectric means 33, as in FIG. 3.

Typical further combined apparatus according to the invention comprises a plurality of such combinations of individual apparatuses (e.g. a plurality of the combinations shown in FIG. 3), wherein individual potential differences comprising analogs of the individual component values of a selected vector are connected to the same respective first electrooptic reflective means 18 in each such combination of individual apparatuses, and individual potential differences comprising analogs of the individual values in each row of a selected matrix are connected to the same respective second electrooptic reflective means 23 in one such combination, the potential differences for each row of the matrix being connected to a different combination of individual apparatuses from any combination to which the potential differences for any other row are connected, whereby the output of each separate combination of individual apparatuses is an analog of one component value of the vector product of the selected matrix and the selected vector.

Other typical, and generally preferred, further combined apparatus for use in matrix by vector multiplication, illustrated in FIG. 5, comprises a plurality of individual first electrooptic reflective means 18, each arranged adjacent to and in tandem with another; a like plurality of individual first control means 28 ($V_1 V_2 V_3$), one for each individual first electrooptic reflective means 18; a first like plurality of individual second electrooptic reflective means 23, one for each first electrooptic reflective means 18, each arranged adjacent to and in tandem with another, to form a first combination of individual second electrooptic reflective means (at $M_{11} M_{12} M_{13}$); a first like plurality of individual second control means 30, one for each individual second reflective means 23 in the first combination thereof, to form a first set of individual second control means ($M_{11} M_{12} M_{13}$); at least one additional like combination of individual second electrooptic reflective means; (FIG. 5 shows two additional combinations, one at $M_{21} M_{22} M_{23}$ and another at $M_{31}$ $M_{32}$ $M_{33}$); an additional like set of individual second electrooptic reflective means; (e.g. $M_{21}$ $M_{22}$ $M_{23}$ and $M_{31}$ $M_{32}$ $M_{33}$ in FIG. 5); a plurality of intermediate means 21A, 21B, 21C, one for each combination of individual second electrooptic reflective means, for directing light 11 reflected from each first Bragg grating in the plurality of first electrooptic reflective means 18 in approximately equal portions to the corresponding second Bragg grating in each combination of individual second electrooptic reflective means 23; and a plurality of output means 35A,$P_1$;35B,$P_2$;35C,$P_3$; one for each combination of individual second electrooptic reflective means; each output means comprising means such as a waveguide lens 35A,35B,35C for receiving the light travelling beyond each second electrooptic reflective means 23 in the selected output direction 16 and directing substantially all of it to means such as a photoelectric cell $P_1$,$P_2$,Phd 3 for providing an electric signal of amplitude responsive to the intensity of the light and thus providing an indication that is an analog of one component value of the vector product of a matrix and a vector; where the potential differences provided by the individual first control means $V_1$ $V_2$ $V_3$ comprise analogs of the individual component values of the vector, the potential differences provided by the individual second control means $M_{11}$ $M_{12}$ $M_{13}$ of the first set thereof comprise analogs of the individual values in the first row of the matrix, and the potential differences provided by the individual second control means of each additional set thereof $M_{21}$ $M_{22}$ $M_{23}$ and $M_{31}$ $M_{32}$ $M_{33}$ comprise analogs of the individual values in each respective succeeding row of the matrix.

In such apparatus, typical intermediate means 21 comprise first beam splitting means 21A for receiving light 11A reflected from the plurality of individual first electrooptic reflective means 18 and reflecting approximately $1/n$ of the light (11AR) to the nth combination of individual second electrooptic reflective means (lower third of FIG. 5) (where n is the number of such combinations) while further transmitting approximately $$\frac{n-1}{n}$$

of the light (11B); second beam splitting means 21B for receiving the light 11B transmitted by the first beam splitting means 21A and reflecting approximately $$\frac{1}{n-1}$$

of it (11BR) to the (n−1)th combination of individual second electrooptic reflective means (middle third of FIG. 5) while further transmitting approximately $$\frac{n-2}{n-1}$$

of it (11C); and so on similarly to the (n−1)th beam splitting means, which reflects approximately ½

$$\left(\text{i.e. } \frac{1}{n-(n-2)}\right)$$

of the light it receives to the second combination of individual second electrooptic reflective means while further transmitting approximately ½

$$\left(\text{i.e. } \frac{n-(n-1)}{n-(n-2)}\right)$$

of it to means 21C for directing approximately all (21CR) of the light it receives to the first combination of individual second electrooptic reflective means (upper third of FIG. 5). In FIG. 5, n=3, so the second beam splitting means 21B is the (n−1)th, and thus reflects approximately ½ of the light it receives and further transmits approximately ½.

In apparatus of the type shown in FIG. 5, each output means typically comprises means 35A,35B,35C for imaging the output light 15 from its combination of individual second electrooptic reflective means onto photoelectric means $P_1$ $P_2$ $P_3$.

The following explanation brings out the operating principles of a typical integrated optics device for vector-matrix multiplication, with an analysis of the product-signal extraction therein.

The operation of vector matrix multiplication is of importance in a variety of signal-processing applications. In particular, it has obvious utility in the processing of multispectral-sensor data. We describe here a new concept for an integrated-optical device which performs the vector matrix multiplication operation using electrooptic analog techniques. Because of the analog nature of the device it is expected to have limited grey-scale resolution (perhaps eight levels). On the other hand the device is expected to be very fast (a complete multiplication in less than 10 nsec) and to require signal voltages of less than 10 volts. It can fabricated so that the matrix is preprogrammed or programmable in real time.

Figure 1:
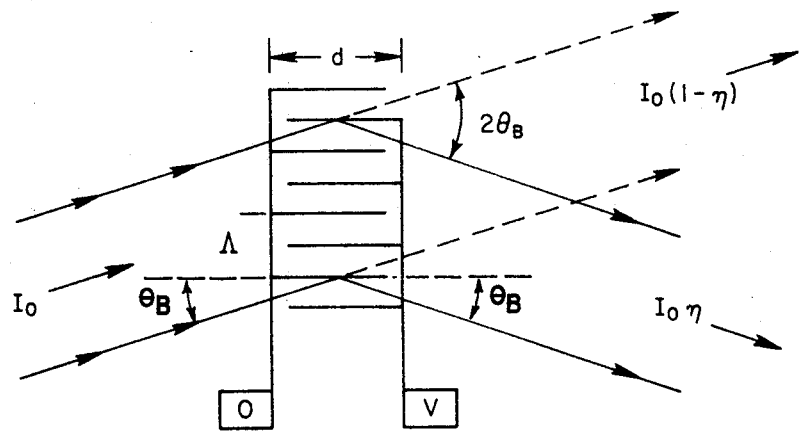
FIG. 1 is a schematic plan view of a basic electrode structure, known in the art, for forming a phase grating in an electrooptic waveguide.

The vector-matrix multiplication device which we describe here is a monolithic device which is fabricated upon the surface of a planar electrooptic waveguide. The basic active structure employed in this device is an interdigitated electrode structure such as that shown schematically in FIG. 1. When a voltage V is applied to such a structure, it produces a periodic electric field in the waveguide which, via the electrooptic effect, results in the formation of a phase grating in the waveguide. A guided wave incident upon the grating region at the Bragg angle $\theta_B$, is diffracted by the phase grating. The diffraction efficiency is given by $$\eta = \sin^2 aV \quad (1)$$

where a is a constant which depends upon the electrooptic coefficient, the Bragg angle, the wavelength of the light λ and the grating width. The Bragg angle is defined by $$\sin\theta_B = \frac{\lambda}{2\Lambda} \quad (2)$$

where Λ is the grating spacing.

A modification of the basic grating structure which can be used to perform multiplication is shown in FIG. 2. The central electrode, or "spine", of this structure is at ground potential. The two voltages to be multiplied, A and B, are applied to the left and right outer electrode structures as shown. The intensity of the doubly diffracted beam is $$I = I_0 \eta_1 \eta_2 \qquad (3)$$

where $\eta_1$ and $\eta_2$ are the diffraction efficiencies of the first and second grating, respectively, and $I_o$ is the incident light intensity. The system is complicated by the fact that the efficiencies are not linearly proportional to the applied voltages. This complication will be dealt with in detail, For the present, we will assume that a signal proportional to the product AB can be extracted from the output light intensity.

The vector-matrix multiplication which we intend to perform is defined, in three dimensions by $$\bar{\bar{M}} \cdot \vec{V} = \begin{pmatrix} M_{11} M_{12} M_{13} \\ M_{21} M_{22} M_{23} \\ M_{31} M_{32} M_{33} \end{pmatrix} \begin{pmatrix} V_1 \\ V_2 \\ V_3 \end{pmatrix} \qquad (4)$$

$$= \begin{pmatrix} M_{11}V_1 \, M_{12}V_2 \, M_{13}V_3 \\ M_{21}V_1 \, M_{22}V_2 \, M_{23}V_3 \\ M_{31}V_1 \, M_{32}V_2 \, M_{33}V_3 \end{pmatrix} = \begin{pmatrix} P_1 \\ P_2 \\ P_3 \end{pmatrix}$$

In Eq. 4 the components of the input vector are represented by $V_i$, the components of the matrix by $M_{ij}$, and the components of the product vector by $P_i$. As can be seen, each $P_i$ is obtained by summing a set of products. The planar optical approach for performing this operation is shown in FIG. 3. The structure of FIG. 2 is segmented so that it can be addressed in three discrete regions. Each of these forms one product $A_iB_i$ and the products are summed by using a lens to collect the light so that it impinges upon a single photodetector. We have thus been able to form one of the quantities $P_i$ of Eq. 4.

There are two approaches to taking the next step, the proper approach being determined largely by the dimensionality of the matrix being considered. If the dimensionality is low, as in the three dimensional case illustrated schematically in FIG. 3, then the matrix-vector multiplier can be fabricated simply by replicating the structure of FIG. 3, three times on the same substrate. In this case the voltages $V_1$, $V_2$, and $V_3$ which represent the vector components must be applied to each of the three structures at the points $A_1$, $A_2$, and $A_3$ respectively. The voltages corresponding to each of the three rows of the matrix will be applied at the points $B_i$ and will be different for each of the three elements. Using this approach there will have to be 2 $N^2$ (plus grounds) connections to the IOC. In the three dimensional case this amounts to $18+1$ connections which is easy to accomplish.

Figure 4:
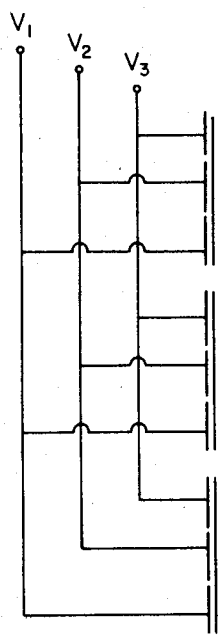
FIG. 4 is a schematic plan view of part of the typical wiring for connecting electrical potentials to electrodes in typical embodiments of the invention.

Suppose now that we consider the case of an $8 \times 8$ matrix. The number of connections now required exceeds 128 and it becomes worthwhile to consider methods for reducing this number even at the expense of a more complex fabrication scheme. Since there are $N^2+N$ independent variables in the most general case, it should be possible to eliminate $N^2-N$ connections. One method of accomplishing this is to devise a metallization pattern for connecting in parallel the electrodes corresponding to each of the N vector components. The problem with this approach is suggested in FIG. 4 where it is seen that it is impossible to avoid crossings of the leads. In order to prevent shorts, a series of buffer layers would be required. For an N-dimensional matrix, this approach requires N photolithographic steps and the deposition of $N-1$ buffer layers.

A more elegant approach to the problem of reducing the number of connections to the IOC is shown in FIG. 5. Here, the two segments of the basic vector multiplication structures have been separated so that the common vector input can be replicated optically using a series of beam splitters. This process will require only one holographic exposure to form the gratings, but a procedure will have to be developed to produce gratings whose efficiencies vary as shown. We currently favor this method since it requires a much smaller number of fabrication steps than the buffer-layer approach.

A complete IOC for vector-matrix multiplication would include, in addition to the electrode arrays, beam-splitters and lenses shown in FIG. 5, a suitable detector array and a butt-coupled laser diode with an integrated collimating lens. We have carried out preliminary design calculations which indicate that for an $8 \times 8$ matrix this entire IOC could fit on a $1\frac{1}{2}'' \times 2''$ LiNbO$_3$ slab.

The efficiency of a Bragg grating is $$\eta = \sin^2(\phi) \qquad (1)$$

where $\phi$ is a phase shift, proportional to the voltage applied across the grating. To use the grating for multiplication it is preferable to have an output which is a linear function of the input voltage rather than a sin$^2$ function. To derive this desired output we will consider the diffracted intensity from the multiplier when there is a common biasing phase shift (produced by a common bias voltage) applied to the device and the signals are modulated at frequency $\omega$. We will show that, for small signals, the modulation produces terms proportional to the product of the signal voltages.

Let the common biasing phase shift be $\phi_o$ and the signal applied to a grating be $\phi'$. Then, the efficiency in Eq. (1) can be written as $$\eta = \sin^2(\phi_o + \phi') = \sin^2\phi_o + \phi' \sin 2\phi_o \qquad (2)$$
$$+ \phi'^2 \cos 2\phi_o - (\tfrac{2}{3})\phi'^3 \sin 2\phi_o + \ldots$$

The ratio of the diffracted intensity to that incident upon the multiplier is the product of two such expressions with signals $\phi'$ and $\phi''$. Denoting this ratio by R, we find $$R = \sin^4\phi_o + (\phi' + \phi'') \sin^2\phi_o \sin 2\phi_o \qquad (3)$$
$$+ (\phi'^2 + \phi''^2) \sin^2\phi_o \cos 2\phi_o + \phi'\phi'' \sin^2 2\phi_o$$
$$- \tfrac{2}{3}(\phi'^3 + \phi''^3) \sin^2\phi_o \sin 2\phi_o$$
$$+ (\phi'\phi''^2 + \phi'^2\phi'') \sin 2\phi_o \cos 2\phi_o + \ldots$$

If we now set $\phi_o = \pi/4$, placing the operating point of each grating on the inflection point of the diffraction efficiency curve, then $\sin 2\phi_o = 1$, $\cos 2\phi_o = 0$, and we have $$R = \tfrac{1}{4} + (\phi' + \phi'')/2 + \phi'\phi'' \qquad (4)$$
$$- (\phi'^3 + \phi''^3)/3 + \ldots$$

Now, setting $$\phi' = \phi_1 \sin\omega t \qquad (5)$$

$$\phi'' = \phi_2 \sin\omega t$$

we have the expansion $$R = R_{dc} + R_1 \sin\omega t + R_2 \cos 2\omega t \qquad (6)$$
$$+ R_3 \sin 3\omega t + \ldots$$

with $$R_{dc} = \tfrac{1}{4} + \phi_1\phi_2/2 \qquad (7a)$$

$$R_1 = (\phi_1 + \phi_2)/2 - (\phi_1^3 + \phi_2^3)/4 \qquad (7b)$$

$$R_2 = -\phi_1\phi_2/2 \qquad (7c)$$

$$R_3 = (\phi_1^3 + \phi_2^3)/12 \qquad (7d)$$

Thus, if we detect the dc part of the diffracted signal, we can obtain the product as $$\phi_1\phi_2 = 2R_{dc} - 0.5 \qquad (8)$$

In the event that the bias is not precisely $\pi/4$, we will incur an error in the product. In this case, we will have instead of Eq. (7a), $$R = \sin^4\phi + (\phi_1^2 + \phi_2)^2 \sin^2\phi_o \cos 2\phi_o/2 + \sin^2 2\phi_o/2 \qquad (9)$$

and it is easy to show that if $\phi_o = \pi/4 + \epsilon$, then Eq. (9) is Eq. (7a) plus a term $$\delta R_{dc} = -(1 - (\phi_1^2 + \phi_2^2)/4)\epsilon \qquad (10)$$

As might have been expected, this is linear in the phase-bias error.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. Apparatus for receiving light entering in a predetermined input direction therein and controlling the directions in which portions of the light travel through regions thereof so as to emerge therefrom in a selected output direction with intensity responsive to the product of a plurality of electrical potential differences multiplied together, comprising an electrooptic waveguide, first electrooptic reflective means, comprising a first electrode and a second electrode, on a first region in the waveguide, for forming a first Bragg grating in the first region positioned with a direction of Bragg incidence approximately in the predetermined input direction, intermediate means for directing light reflected from the first Bragg grating in a predetermined intermediate direction into a second region in the waveguide, second electrooptic reflective means, comprising a third electrode and a fourth electrode, on the second region in the waveguide, for forming a second Bragg grating in the second region positioned with a direction of Bragg incidence in approximately the predetermined intermediate direction, light input means for directing light of known or controlled intensity to enter approximately in the predetermined input direction into the first electrooptic means, first control means for applying a first electrical potential to the first electrode and a second electrical potential to the second electrode, to further direct a portion of the light entering into the first region by providing a first Bragg reflection thereof into the intermediate means, and second control means for applying a third electrical potential to the third electrode and a fourth electrical potential to the fourth electrode, to further direct a portion of the light reflected into the second region by providing a second Bragg reflection thereof beyond the second region in the selected output direction.

2. Apparatus as in claim 1, wherein the predetermined intermediate direction is approximately the same as a direction of Bragg reflection from the first Bragg grating, and the intermediate means comprises means for transmitting light reflected from the first Bragg grating further in approximately the same direction into the second region in the waveguide.

3. Apparatus as in claim 1, wherein the predetermined intermediate direction is different from any direction of Bragg reflection from the first Bragg grating, and the intermediate means comprises means for changing the direction of light reflected from the first Bragg grating and directing it in approximately the predetermined intermediate direction into the second region of the waveguide.

4. Apparatus as in claim 1, comprising also output means for receiving the twice-reflected light travelling beyond the second region in the selected output direction and for responding thereto.

5. Apparatus as in claim 1, wherein the first electrode comprises a first set of substantially straight and parallel, thin, elongate, electrically conductive members connected together at one end, and the second electrode comprises a second set of substantially straight and parallel, thin, elongate, electrically conductive members, interleaved with the first set, insulated therefrom, and connected together at the opposite end.

6. Apparatus as in claim 5, wherein the third electrode comprises a third set of substantially straight and parallel, thin, elongate, electrically conductive members connected together at one end, and the fourth electrode comprises a fourth set of substantially straight and parallel, thin, elongate, electrically conductive members, interleaved with the third set, insulated therefrom, and connected together at the opposite end.

7. Apparatus as in claim 6, wherein the third and fourth electrodes are positioned with their conductive members at an angle from the first and second electrodes that is approximately equal to the Bragg angle of the first grating plus the Bragg angle of the second grating.

8. Apparatus as in claim 7, wherein the Bragg angle of the first grating is approximately equal to the Bragg angle of the second grating.

9. Apparatus as in claim 6, wherein the Bragg angle of the first grating is approximately equal to the Bragg angle of the second grating.

10. Apparatus as in claim 9, wherein the first, second, third, and fourth electrodes are positioned with their conductive members all approximately parallel to each other.

11. Apparatus as in claim 10, wherein the second electrooptic reflective means comprises approximately a mirror image of the first elelectrooptic reflective means, shifted in a direction perpendicular to the lengthwise direction of the electrodes, so that the twice-reflected light travelling beyond the second region in the selected output direction has approximately the same direction of travel as that of any light entering in the predetermined input direction and continuing through without any reflection, but is spaced apart therefrom.

12. Apparatus as in claim 1, wherein the second electrooptic reflective means comprises approximately a mirror image of the first electrooptic reflective means.

13. Apparatus as in claim 1, wherein an electrode of the first electrooptic reflective means is connected to an electrode of the second electrooptic reflective means.

14. Apparatus as in claim 1, wherein the first, second, third, and fourth electrodes are all insulated from each other.

15. Apparatus as in claim 1, comprising a plurality of individual such apparatuses, each arranged adjacent to and in tandem with another.

16. Apparatus as in claim 15, wherein an electrode of the first electrooptic reflective means in each individual apparatus is connected to an electrode of the first electrooptic reflective means in another individual apparatus, and an electrode of the second electrooptic reflective means in each individual apparatus is connected to an electrode of the second electrooptic reflective means in another individual apparatus.

17. Apparatus as in claim 15, wherein the electrodes of each individual apparatus are insulated from the electrodes of the other individual apparatuses.

18. Apparatus as in claim 1, wherein the first control means comprises means for providing a fixed component of potential difference between the first and second electrodes such as to bias them to a value where the grating response is approximately a linear function of potential difference within a known range, and a variable component of potential difference within the range of the approximately linear response function; and the second control means comprise means for providing a fixed component of potential difference between the third and fourth electrodes such as to bias them to a value where the grating response to approximately a linear function of potential difference within a known range, and a variable component of potential difference within the range of the approximately linear response function; whereby the intensity of the light emerging in the selected output direction includes a part that is approximately a linear function of the product of the variable component of potential difference provided by the first control means multiplied by the variable component of potential difference provided by the second control means.

19. Apparatus as in claim 18, comprising also means for providing an electric signal of amplitude responsive to the intensity of the light emerging in the selected output direction, and means for removing substantially all alternating components from the signal and thus leaving only direct components, which comprise approximately a linear function of the product of the variable component of potential difference provided by the first control means multiplied by the variable component of potential difference provided by the second control means.

20. Apparatus as in claim 18, comprising also means for providing an electric signal of amplitude responsive to the intensity of the light emerging in the selected output direction, and means for removing substantially all components from the signal except the second harmonic alternating component, which comprises approximately a linear function of the product of the variable component of potential differences provided by the first control means multipled by the variable component of potential difference provided by the second control means.

21. Apparatus as in claim 18, comprising, in combination, a plurality of individual such apparatuses, each arranged adjacent to and in tandem with another, and output means for receiving the twice-reflected light travelling beyond each second region in the selected output direction and directing substantially all of it to means for providing an electric signal of amplitude responsive to the intensity of the light and thus providing an indication responsive to the vector inner product of the variable components of the potential differences on the individual first control means and the variable components of the potential differences on the respective individual second control means.

22. Apparatus as in claim 21, wherein the output means comprises means for imaging the output light from the individual apparatuses onto photoelectric means.

23. Apparatus as in claim 21, comprising a plurality of such combinations of individual apparatuses, wherein
individual potential differences comprising analogs of the individual component values of a selected vector are connected to the same respective first electrooptic reflective means in each such combination of individual apparatuses, and
individual potential differences comprising analogs of the individual values in each row of a selected matrix are connected to the same respective second electrooptic reflective means in one such combination, the potential differences for each row of the matrix being connected to a different combination of individual apparatuses from any combination to which the potential differences for any other row are connected,
whereby the output of each separate combination of individual apparatuses is an analog of one component value of the vector product of the selected matrix and the selected vector.

24. Apparatus as in claim 1, wherein the first control means comprises means for providing selectively either approximately zero potential difference or at least approximately a predetermined finite potential difference between the first and second electrodes, and the second control means comprises means for providing selectively either approximately zero potential difference or at least approximately a predetermined finite potential difference between the third and fourth electrodes; whereby the intensity of the light emerging in the selected output direction at a given instant is either approximately zero or at least approximately a determinable output value, as a digital binary AND function of the potential differences provided by the first and second control means.

25. Apparatus as in claim 1, comprising a plurality of individual such apparatuses, each arranged adjacent to and in tandem with another, wherein each first control means comprises means for providing a potential difference within a range wherein the grating response is approximately a quadratic function of potential difference, and each second control means comprises means for providing a potential difference within a range wherein the grating response is approximately a quadratic function of potential difference.

26. Apparatus as in claim 22, comprising also output means for receiving the twice-reflected light travelling beyond each second region in the selected output direction and directing substantially all of it to means for providing an electric signal of amplitude responsive to the intensity of the light and thus providing an indication responsive to the vector inner product of the squares of the potential differences on the individual first control means and the squares of the potential differences on the respective individual second control means.

27. Apparatus as in claim 1, comprising
a plurality of individual first electrooptic reflective means, each arranged adjacent to and in tandem with another;
a like plurality of individual first control means, one for each individual first electrooptic reflective means;
a first like plurality of individual second electrooptic reflective means, one of each first electrooptic reflective means, each arranged adjacent to and in tandem with another, to form a first combination of individual second electrooptic reflective means;
a first like plurality of individual second control means, one for each individual second electrooptic reflective means in the first combination thereof, to form a first set of individual second control means;
at least one additional like combination of individual second electrooptic reflective means;
an individual like set of individual second control means for each additional combination of individual second electrooptic reflective means;
a plurality of intermediate means, one for each combination of individual second electrooptic reflective means, for directing light reflected from each first Bragg grating in the plurality of first electrooptic reflective means in approximately equal portions to the corresponding second Bragg grating in each combination of individual second electrooptic reflective means; and
a plurality of output means, one for each combination of individual second electrooptic reflective means;
each output means comprising means for receiving the light travelling beyond each second electrooptic reflective means in the selected output direction and directing substantially all of it to means for providing an electric signal of amplitude responsive to the intensity of the light and thus providing an indication that is an analog of one component value of the vector product of a matrix and a vector; where the potential differences provided by the individual first control means comprise analogs of the individual component values of the vector, the potential differences provided by the individual second control means of the first set thereof comprise analogs of the individual values in the first row of the matrix, and the potential differences provided by the individual second control means of each additional set thereof comprise analogs of the individual values in each respective succeeding row of the matrix.

28. Apparatus as in claim 27, wherein the intermediate means comprise first beam splitting means for receiving light reflected from the plurality of individual first electrooptic reflective means and reflecting approximately $1/n$ of the light to the nth combination of individual second electrooptic reflective means (where n is the number of such combinations) while further transmitting approximately $$\frac{n-1}{n}$$

of the light, second beam splitting means for receiving the light transmitted by the first beam splitting means and reflecting approximately $$\frac{1}{n-1}$$

of it to the (n−1) th combination of individual second electrooptic reflective means while further transmitting approximately $$\frac{n-2}{n-1}$$

of it, and so on similarly to the (n1)th beam splitting means, which reflects approximately $\frac{1}{2}$ $$\left(\text{i.e. } \frac{1}{n-(n-2)}\right)$$

of the light it receives to the second combination of individual second electrooptic reflective means while further transmitting approximately $\frac{1}{2}$ $$\left(\text{i.e. } \frac{n-(n-1)}{n-(n-2)}\right)$$

of it to means for directing approximately all of the light it receives to the first combination of individual second electrooptic reflective means.

29. Apparatus as in claim 27, wherein each output means comprises means for imaging the output light from its combination of individual second electrooptic reflective means onto photoelectric means.

* * * * *